United States Patent
Garrido et al.

(10) Patent No.: US 12,333,242 B2
(45) Date of Patent: Jun. 17, 2025

(54) EMBEDDED TAG INTERFACE FOR DOCUMENT GENERATION IN A DOCUMENT MANAGEMENT SYSTEM

(71) Applicant: DocuSign, Inc., San Francisco, CA (US)

(72) Inventors: Carlos Manuel Garrido, Geneva, IL (US); Andre Makram, Newcastle, WA (US); Mohamed Gomaa, Seattle, WA (US); John Jason Leahy, Chicago, IL (US); Reetika Jain, Chicago, IL (US); Hailey Veronica Dhanens, San Antonio, TX (US); Praveen Alluri, Aurora, IL (US); Sean-Ryan William Smith, Foster City, CA (US); Jeremy Michael Turinetti, Chicago, IL (US); Dunja Hadzimusic, Chicago, IL (US); Ikwuagwu Emole, Seattle, WA (US); Deepinder Badesha, Union City, CA (US); Dania Michele Marinshaw, Chicago, IL (US); Megan Elizabeth Schwarz, Chicago, IL (US); Michelle Lam, Los Angeles, CA (US); Chadwick Taylor Roffey, Pacifica, CA (US); Kyle Anthony Uhelski, Soquel, CA (US); Iqra Anjum, San Francisco, CA (US); Aylin Selcukoglu, Chicago, IL (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 17/710,707

(22) Filed: Mar. 31, 2022

(65) Prior Publication Data

US 2023/0315977 A1     Oct. 5, 2023

(51) Int. Cl.
*G06F 40/186*     (2020.01)
*G06F 16/93*     (2019.01)
(Continued)

(52) U.S. Cl.
CPC ............ *G06F 40/186* (2020.01); *G06F 16/93* (2019.01); *G06F 40/169* (2020.01); *G06F 40/174* (2020.01)

(58) Field of Classification Search
CPC ....... G06F 40/166; G06F 40/186; G06F 16/93
See application file for complete search history.

(56) References Cited

U.S. PATENT DOCUMENTS

| 9,634,875 | B2 | 4/2017 | Porat |
| 9,634,975 | B2 | 4/2017 | McCabe |

(Continued)

*Primary Examiner* — Scott T Baderman
*Assistant Examiner* — Seung Woon Jung
(74) *Attorney, Agent, or Firm* — KDW Firm PLLC

(57) ABSTRACT

A document management system generates a document template within which a user can embed document tags. Each document tag represents a term of the document. The user selects a document tag and identifies a location for the document tag within the document template. The embedded document tag adheres to formatting rules of the document template. The document management system accesses a data value corresponding to the selected document tag and generates a modified document. The modified document includes the accessed data value at the identified location, and is subject to the formatting rules of the document template.

20 Claims, 9 Drawing Sheets

(51) Int. Cl.
    *G06F 40/169*     (2020.01)
    *G06F 40/174*     (2020.01)

(56) References Cited

U.S. PATENT DOCUMENTS

| | | | |
|---|---|---|---|
| 10,430,570 B2 | 10/2019 | Gonser | |
| 2016/0364608 A1* | 12/2016 | Sengupta | G06V 30/414 |
| 2021/0019360 A1* | 1/2021 | Li | G06F 40/169 |
| 2022/0157410 A1* | 5/2022 | Wei | G16H 10/60 |
| 2023/0125321 A1* | 4/2023 | Mankovich | G16H 15/00 |
| | | | 705/2 |
| 2023/0274084 A1* | 8/2023 | Modani | G06F 40/174 |
| | | | 715/243 |

* cited by examiner

Document Management System Dashboard

Form for MASTER SERVICES AGREEMENT

Party Details

Party 1 Name
ABC Construction Services

Party 2 Name
XYZ Property Managers — 420

Agreement Timeline

Effective Date
May 1, 2022

Termination Date
May 1, 2024

Suggested Terms
▸ Payment Deadline
  Delivery Date
— 440

EMBEDDED TAG INTERFACE FOR DOCUMENT GENERATION IN A DOCUMENT MANAGEMENT SYSTEM

TECHNICAL FIELD

The disclosure generally relates to the field of document management, and specifically to interfaces for generating documents and performing document actions in document management systems.

BACKGROUND

Online document management systems can be used to create and review documents and may provide users with tools to edit, view, and execute the documents. Conventional document management systems require users to manually create and send new documents to other parties for review and subsequent action. There is a need to provide users with improved and efficient document creation revision processes.

SUMMARY

To help improve the document generation process, a document management system provides users with an embedded tagging interface.

The document management system generates a document template based on a training document received from a user. The document management system displays the document template according to document formatting rules in a first interface portion and displays a set of candidate document tags in a second interface portion. The document management system receives a selection of a candidate document tag and an identification of a location within the displayed document template. The document management system modifies the document template to include a text representation of the selected candidate document tag within text of the displayed document template at the identified location. The document management system receives a request to generate a document using the modified document template and in response, accesses a data value corresponding to the selected candidate document tag, and generates a document using the modified document template such that the accessed data value is included in place of the text representation of the selected candidate document tag and subject to the document formatting rules.

The document management system receives a set of tags selected by a user, the tags applied to a document template. The document management system generates a form interface that includes one or more interface elements corresponding to each of the set of tags. The document management system receives a selection of an interface element corresponding to a tag. The selected interface element includes a field. The document management system modifies the interface element corresponding to the tag to include a populated list of suggested field values, wherein at least one of the suggested field values corresponds to a set of secondary tags that are not applied to the document template by the user. The document management system modifies the interface elements to include fields corresponding to each of the set of secondary tags in response to receiving a selection of a suggested field value corresponding to the set of secondary tags. Finally, the document management system generates a document using the document template in response to a user completing the form interface. The generated document includes selected field values in place of each of the set of tags applied to the document template as well as field values that correspond to each of the set of secondary tags that weren't explicitly included within the document template by the user.

The document management system generates a document workflow interface that includes a starting workflow interface element. The document management system presents a set of first workflow operations after the starting workflow interface element is selected. The document management system modifies the document workflow interface by modifying the starting workflow interface element based on a selected first workflow operation. The modified starting workflow interface element includes fields defining parameters of the selected first workflow operation. The document management system modifies the workflow interface to include a first workflow branch corresponding to an approval workflow operation and a second workflow branch corresponding to a rejection workflow operation. After the approval workflow operation and the rejection workflow operation are defined, the document management system generates a document workflow defining an ordered set of operations including the first workflow operation, the approval workflow operation, and the rejection workflow operation. The document management system performs at least a portion of the ordered set of operations on a target document in response to a request to initiate the document workflow for the target document.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 illustrates a form interface of the document management system, in accordance with an example embodiment.

DETAILED DESCRIPTION

Figure 1:
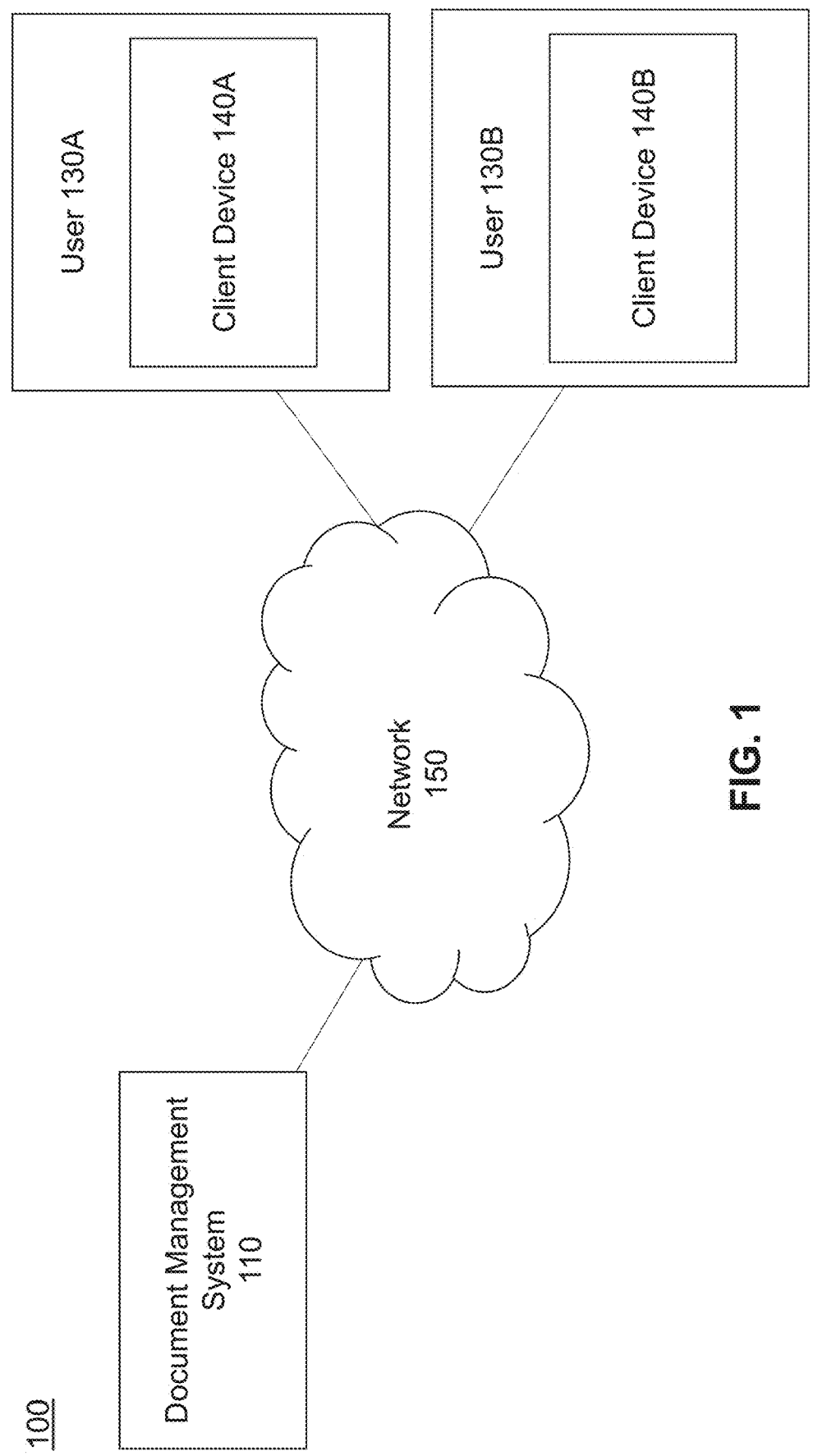
FIG. 1 is a high-level block diagram of a system environment for a document management system, in accordance with an example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

The figures depict embodiments of the disclosed system (or method) for purposes of illustration only. One skilled in the art will readily recognize from the following description that alternative embodiments of the structures and methods illustrated herein may be employed without departing from the principles described herein.

Document Management System Overview

A document management system enables a party (e.g., individuals, organizations, etc.) to create and send documents to one or more receiving parties for negotiation, collaborative editing, electronic execution (e.g., via electronic signatures), contract fulfilment, archival, analysis, and more. For example, the document management system allows users of the party to create, edit, review, and negotiate document content with other users and other parties of the document management system. An example document management system is further described in U.S. Pat. No. 9,634,875, issued Apr. 25, 2017, and U.S. Pat. No. 10,430,570, issued Oct. 1, 2019, which are hereby incorporated by reference in their entireties.

The system environment described herein can be implemented within the document management system, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

The methods described herein describe ways to improve document generation and document action processes in the document management system. The document management system facilitates document tagging and workflow creation. To generate a document, users may embed tags representing various terms within a document template. For example, the tags may correspond to party names, dates, compensation amounts, and so on. Once the document template is tagged, the document management system automatically generates a form. The form is completed with data values corresponding to each of the embedded tags, either from user input or a connected database. The document management system then generates a document for preview, the generated document including the data values corresponding to each of the embedded tags. In the generated document, the data values corresponding to each of the embedded tags are displayed as per formatting rules (e.g., font, text size, indentation rules, bullet points, etc.) of the document template.

Users may choose to take a set of actions with respect to the generated document. Document actions may include, for example, sending the document to another user for approval, signing the document, initiating a negotiation of the terms of the document, and so on. The document management system allows users to customize a workflow for these document actions such that the document management system automatically performs actions upon request.

FIG. 1 is a high-level block diagram of a system environment 100 for a document management system 110, in accordance with an example embodiment. The system environment 100 enables users 130A-B to more efficiently generate documents with the document management system 110. As illustrated in FIG. 1, the system environment 100 includes a document management system 110, users 130A-B, and corresponding client devices 140A-B, each communicatively interconnected via a network 150. In some embodiments, the system environment 100 includes components other than those described herein. For clarity, although FIG. 1 only shows two users 130A-B and two client devices 140A-B, alternate embodiments of the system environment 100 can have any number of users and client devices. For the purposes of concision, the web servers, data centers, and other components associated with an online system environment are not shown in FIG. 1.

The document management system 110 is a computer system (or group of computer systems) for storing and managing documents for the users 130A-B. Using the document management system 110, users 130A-B can collaborate to create, edit, review, and negotiate documents. Examples of documents that may be stored, analyzed, and/or managed by the document management system 110 include contracts, press releases, technical specifications, employment agreements, purchase agreements, services agreements, financial agreements, and so on. The document management system 110 can be a server, server group or cluster (including remote servers), or another suitable computing device or system of devices. In some implementations, the document management system 110 can communicate with client devices 140A-B over the network 150 to receive instructions and send documents (or other information) for viewing on client devices 140A-B. The document management system 110 can assign varying permissions to individual users 130A-B or groups of users controlling which documents each user can interact with and what level of control the user has over the documents they have access to. The document management system 110 will be discussed in further detail with respect to FIG. 2.

Users 130A-B of the client devices 140A-B can perform actions relating to documents stored within the document management system 110. Each client device 140A-B is a computing device capable of transmitting and/or receiving data over the network 150. Each client device 140A-B may be, for example, a smartphone with an operating system such as ANDROID® or APPLE® IOS®, a tablet computer, laptop computer, desktop computer, or any other type of network-enabled device from which secure documents may be accessed or otherwise interacted with. In some embodiments, the client devices 140A-B include an application through which the users 130A-B access the document management system 110. The application may be a stand-alone application downloaded by the client devices 140A-B from the document management system 110. Alternatively, the application may be accessed by way of a browser installed on the client devices 140A-B and instantiated from the document management system 110. The client devices 140A-B enables the users 130A-B to communicate with the document management system 110. For example, the client devices 140A-B enables the users 130A-B to access, review, execute, and/or analyze documents within the document management system 110 via a user interface. In some implementations, the users 130A-B can also include AIs, bots, scripts, or other automated processes set up to interact with the document management system 110 in some way. According to some embodiments, the users 130A-B are associated with permissions definitions defining actions users 130A-B can take within the document management system 110, or on documents, templates, permissions associated with other users and/or workflows.

The network 150 transmits data within the system environment 100. The network 150 may be a local area or wide area network using wireless or wired communication systems, such as the Internet. In some embodiments, the network 150 transmits data over a single connection (e.g., a data component of a cellular signal, or Wi-Fi, among others), or over multiple connections. The network 150 may include encryption capabilities to ensure the security of customer data. For example, encryption technologies may include secure sockets layers (SSL), transport layer security (TLS), virtual private networks (VPNs), and Internet Protocol security (IPsec), among others.

Figure 2:
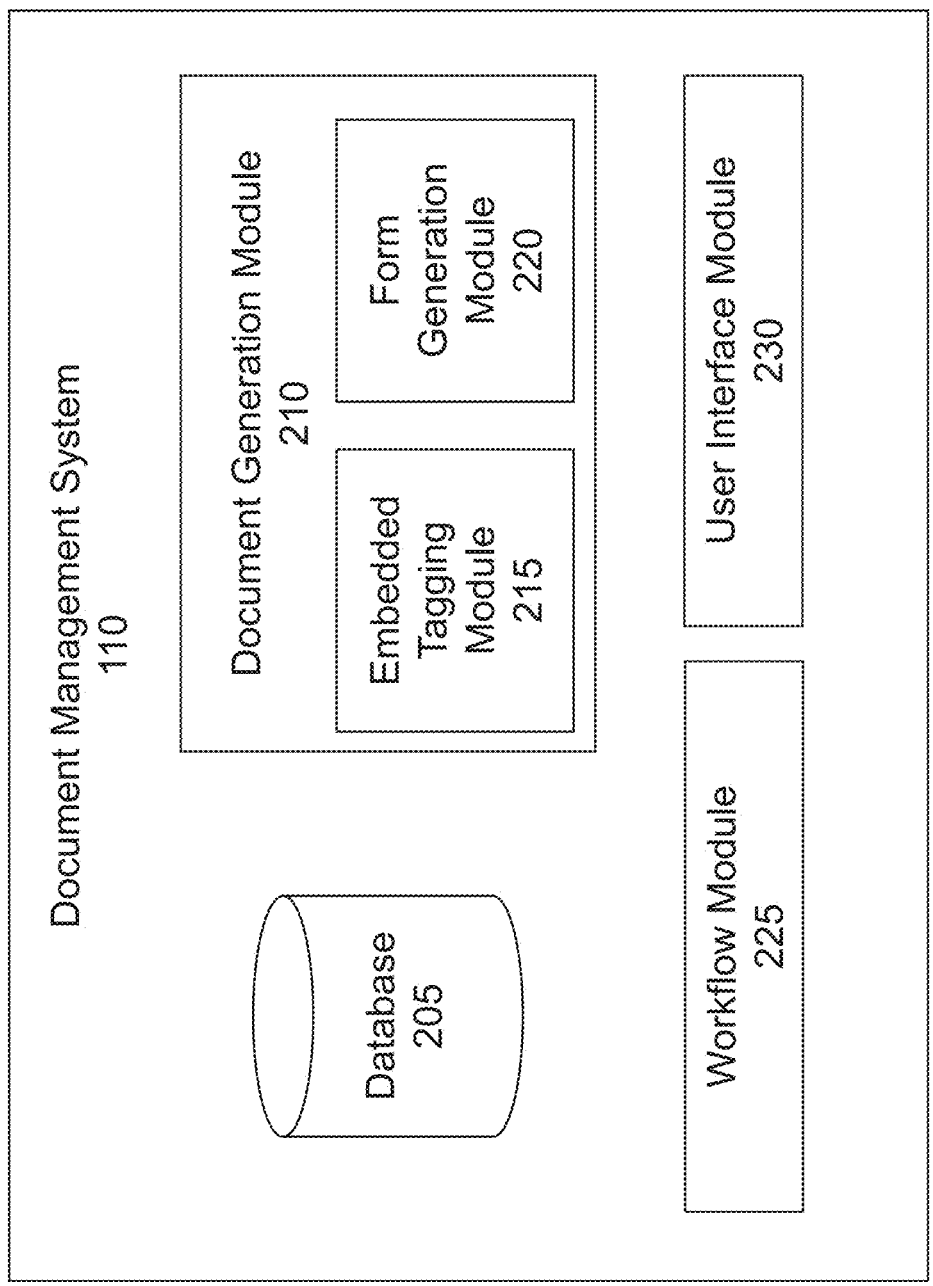
FIG. 2 is a high-level block diagram of a system architecture of the document management system, in accordance with an example embodiment.

FIG. 2 is a high-level block diagram of a system architecture of the document management system 110, in accordance with an example embodiment. To facilitate document tagging and workflow creation, the document management system 110 includes a database 205, a document generation module 210, a workflow module 225, and a user interface module 230. The document generation module 210 includes an embedded tagging module 215 and a form generation module 220. Computer components such as web servers, network interfaces, security functions, load balancers, failover servers, management and network operations consoles, and the like may not be shown so as to not obscure the details of the system architecture. The document management system 110 may contain more, fewer, or different components than those shown in FIG. 2 and the functionality of the components as described herein may be distributed differently from the description herein.

The database 205 stores information relevant to the document management system 110. The database 205 can be implemented on a computing system local to the document management system 110, remote or cloud-based, or using any other suitable hardware or software implementation. The data stored by the database 205 may include, but is not limited to, documents for analysis and/or execution, client device identifiers (e.g., of the client devices 140A-B), document clauses, version histories, document templates, and other information about document stored by the document management system 110. In some embodiments, the database 205 stores metadata information associated with documents or clauses, such as documents labeled with training data for machine learning models. The document management system 110 can update information stored in database 205 as new information is received, such as new documents and feedback from users. The document management system 110 can update information stored in the database 205 based on user input received from a user interface, via the user interface module 230. Updates to machine learned models are also stored in the database 205.

The document generation module 210 facilitates the creation of documents and includes the embedded tagging module 215 and the form generation module 220. After a user uploads a training document, the document generation module 210 generates a document template based on a type of the training document. In some embodiments, the document generation module 210 generates the document template in response to a user request. The document generation module 210 may produce templates for employment agreements, distribution agreements, sales agreements, non-disclosure agreements, leases, promissory notes, and so on.

In some embodiments, the document generation module 210 generates the document template using a machine learned model configured to identify a type of the training document and generate associated terms. The machine learned model is trained on a training set of documents that includes different types of documents that are each labeled with terms. For example, a master services agreement in the training set is labeled accordingly, as are portions of the document that correspond to terms like party names, terms of the services, effective date, and so on. The machine learned model may be trained using supervised or unsupervised machine learning. Different machine learning techniques may be used in various embodiments, such as linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on.

The trained machine learned model, when applied to the training document uploaded by the user, can identify a type of the training document and generate associated terms accordingly. The document generation module 210 uses the machine learned model's output to generate the document template and terms for the type of document uploaded and/or requested by the user. The document template is displayed as per one or more document formatting rules (e.g., bullet points, indentation, font type, font size, text style, etc.).

Embedded Tagging

Figure 3:
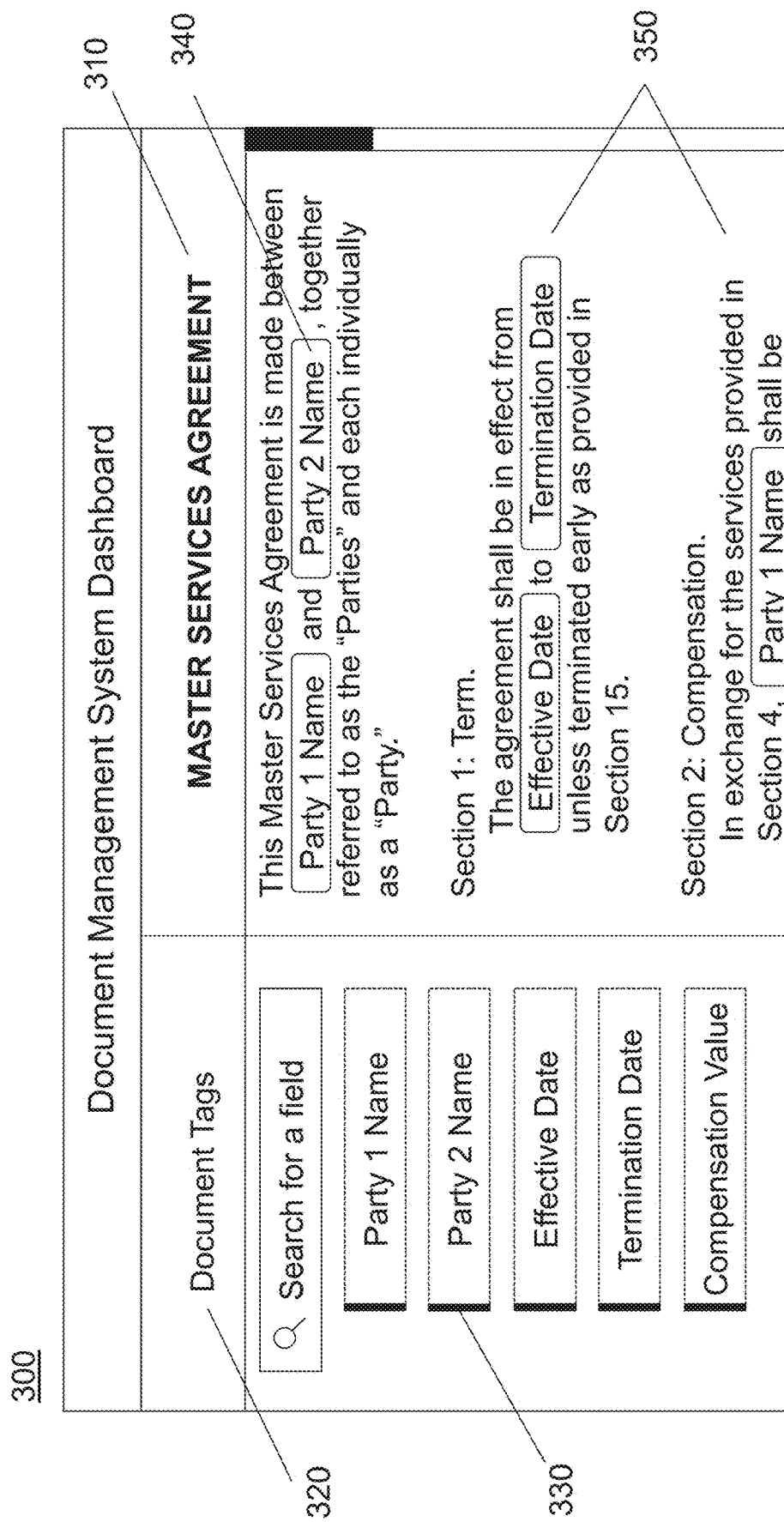
FIG. 3 illustrates an embedded tagging interface of the document management system, in accordance with an example embodiment.

The embedded tagging module 215 allows the user to embed document tags within the document template. The user embeds document tags via an embedded tagging interface of the document management system 110. An example of the embedded tagging interface is shown in FIG. 3. In one portion of the embedded tagging interface, the user selects a candidate document tag from a set of candidate document tags. As described above, the machine learned model used by the document generation module 210 outputs a type of the training document and terms associated with the document type. The embedded tagging module 215 determines the set of candidate document tags from the associated terms output by the machine learned model.

In a second portion of the embedded tagging interface, the embedded tagging module 215 presents the document template. The user identifies a location within the document template for the selected candidate document tag, where the embedded tagging module 215 places a text representation of the selected candidate document tag within the document. The surrounding text of the document template is adjusted accordingly. For example, the user may select the candidate document tag associated with "Party Name," the name of one of the parties to the contract. The user may drag and drop the "Party Name" candidate document tag to an identified location within the document template. The text of the document template adjacent to the identified location will shift based on the length of the text representation of the candidate document tag, thus modifying the document template.

Automatic Form Generation

The form generation module 220 automatically generates a form interface with fields for completion. An example of the form interface is shown in FIG. 4. The form interface displays fields that correspond to the user selected candidate document tags and enable input as to specific terms of the document template. The user selected candidate document tags are received from the embedded tagging module 215.

In some embodiments, the form generation module 220 generates and displays a list of suggested fields corresponding to additional candidate document tags that were not selected by the user. For example, the form generation module 220 may suggest terms that are often found in documents of the same type, but that the user did not select. Additionally, the form generation module 220 determines an order for displaying the fields based on, for example, the order in which the candidate document tags appear on the document template. The form generation module 220 may use the machine learned model described above to generate the suggested fields and/or the order for displaying the fields. The machine learned model is configured to identify the type of the training document and/or document template uploaded by the user, identify terms associated with the type of the document template, and/or an order of the terms within the document template.

The form generation module 220 accesses data values for each of the fields displayed on the form interface. Each data value corresponds to one or more candidate document tags and may be manually input by the user. In some embodiments, the form generation module 220 accesses the data values from a relational database and/or other forms of structured data.

Figure 5:
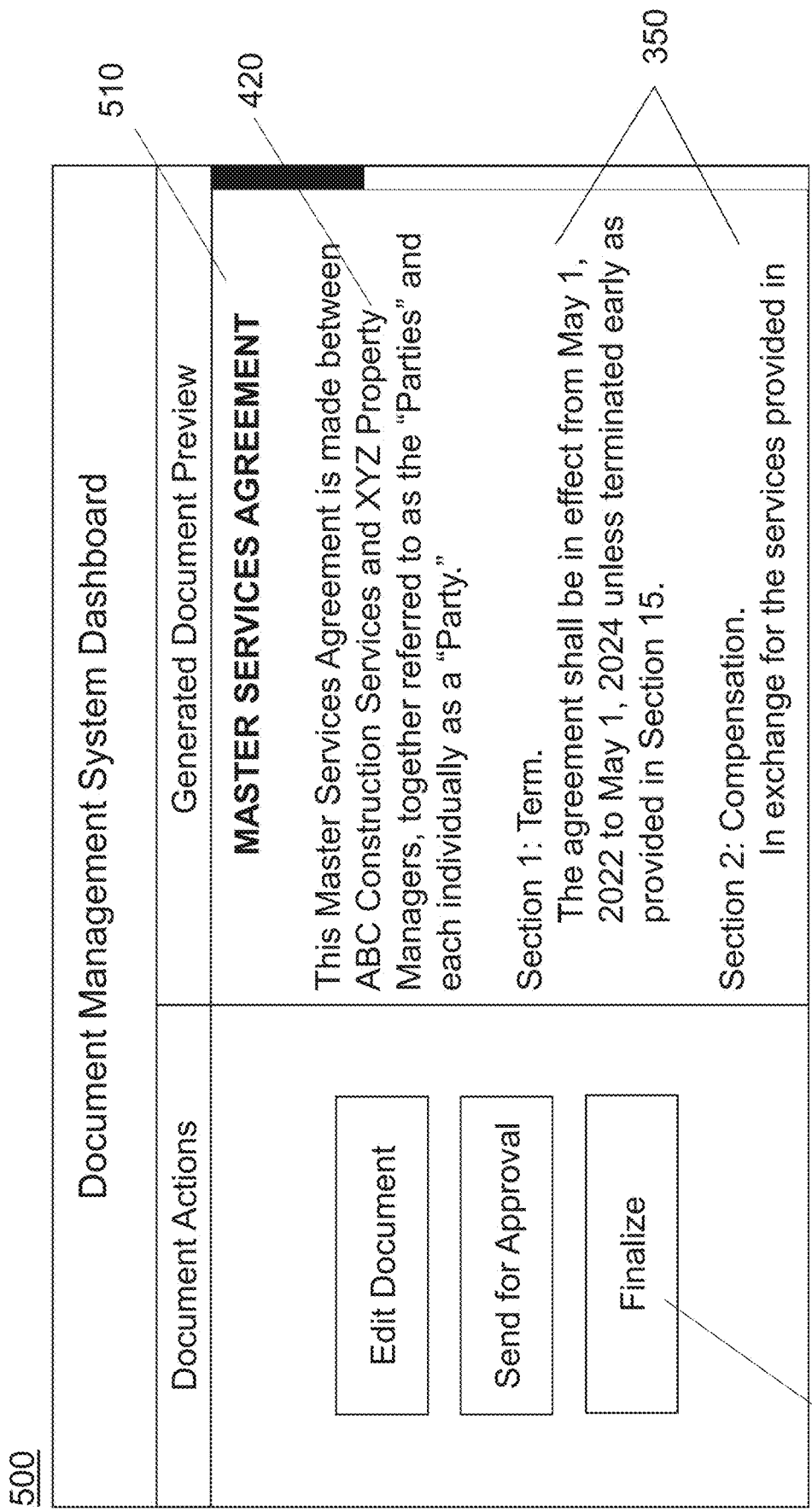
FIG. 5 illustrates an interface of the document management system for viewing a generated document, in accordance with an example embodiment.

Once the form interface is completed, the document generation module 210 creates a document preview for the user. An example generated document preview is shown in FIG. 5. The document preview is a modified document template that includes the accessed data values in place of the text representations of each candidate document tag. The accessed data values in the document preview follow the document template's formatting rules. For example, if the document template designates a set of terms to be indented, the accessed data values corresponding to the set of terms will be indented.

Document Workflow Customization

The workflow module 225 enables users to customize a workflow for document actions. After the document generation module 210 presents the generated document preview, the user can take a set of document actions. Example document actions include, but are not limited to, approving the document, finalizing the document, signing the document, providing the document to another user, and revising the document. The user may manually carry out the document actions. To improve the efficiency of the document management system 110, however, the workflow module 225 allows the user to define workflows (e.g., a sequence of document actions) that the document management system 110 performs automatically.

Figure 8:
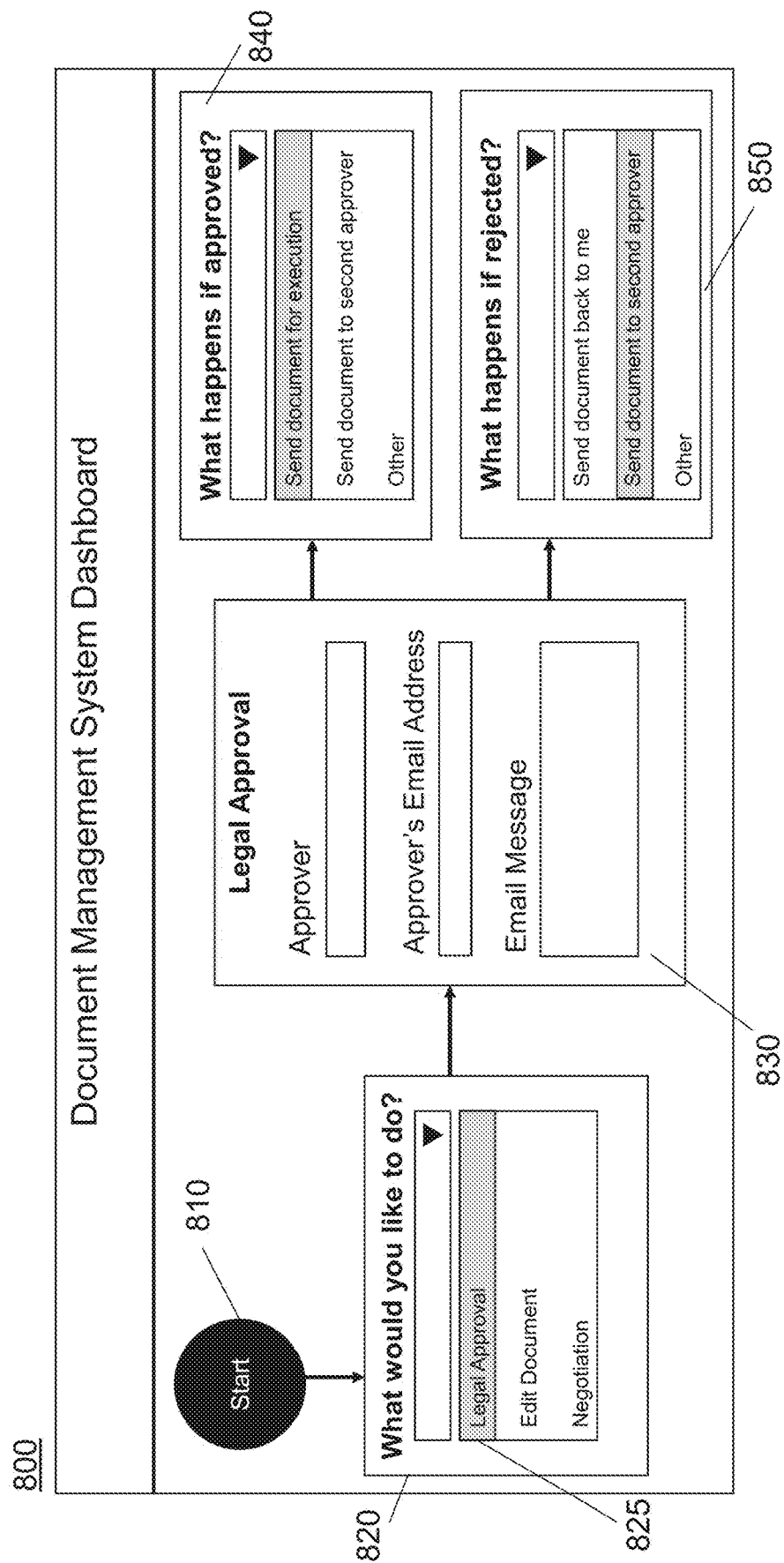
FIG. 8 illustrates a workflow interface in the document management system, in accordance with an example embodiment.

In the document management system 110, the user defines a document workflow via a workflow interface. An example workflow interface is shown in FIG. 8. The workflow module 225 generates a starting element (e.g., a start button), which presents an initial set of workflow operations (e.g., document actions) for the user to select. The workflow module 225 presents one or more fields for the user to complete based on the selected workflow operation. In some embodiments, the workflow module 225 seeks input from the user on "workflow branches." A workflow branch is a workflow for the document management system 110 to follow after a specific outcome of the first workflow operation. After the user requests the initiation of the defined workflow, the workflow module 225 executes each of the actions specified in the workflow.

For example, the user may choose, as the workflow operation, to send a document to a supervisor for approval. The workflow module 225 presents fields to the user, seeking input on the supervisor's name, email address, and any email message to be included with the document. Then, the workflow module 225 asks the user to define an approval workflow branch and a rejection workflow branch. The approval workflow branch designates actions for the document management system 110 to take if the supervisor approves the document. Similarly, the rejection workflow branch designates actions for the document management system 110 to take if the supervisor rejects the document. Each workflow branch can include a second approval workflow branch and a second rejection workflow branch, thus enabling a nested workflow tree corresponding to the document.

In some embodiments, the workflow module 225 determines the initial set of workflow operations to present to the user using a machine learned model. The machine learned model is trained on a training set of documents, each labeled with a type and associated with certain actions. In response to receiving a target document specified by the user, the trained machine learned model is configured to identify a type of the target document and generate a set of workflow operations specific to the type of the target document. In some embodiments, the type of the target document is provided through user input, based on which the machine learned model outputs the initial set of workflow operations.

The user interface (UI) module 230 generates user interfaces allowing users (e.g., the users 130A-B) to interact the document management system 110. The UI module 230 displays and receives user input for the embedded tagging interface, the form interface, and the workflow interface in the document management system 110. The UI module 230 also provides a user interface for users to add, delete, or modify the contents of a document template, document preview, or finalized document based on permission definitions. Additionally, in some embodiments, the UI module 230 may provide a user interface that allows users to modify content such as text, images, links to outside sources of information such as databases, and the like.

Example Embedded Tagging Interface

FIG. 3 illustrates an embedded tagging interface 300 of the document management system 110, in accordance with an example embodiment. A first portion of the embedded tagging interface 300 displays a document template 310; a second portion displays a set of candidate document tags 320. As described above, the document management system 110 generates the document template 310 after receiving a training document from a user (e.g., the users 130A-B). The document management system 110 displays the set of candidate document tags 320 based on a type of the training document. The user can select an individual candidate document tag, e.g., the candidate document tag 330, and place the candidate document tag at an identified location 340 within the document template 310. A text representation of the selected candidate document tag 330, in this case "Party 2 Name," is placed at the identified location 340. Thus, the candidate document tag 330 is dynamically embedded into the document template 310.

The document management system 110 preserves formatting rules of the document template 310 while embedding candidate document tags. For example, the indentation 350 of Sections 1 and 2 of the document template 310 is maintained when the candidate document tags of "Effective Date," "Termination Date," and "Party 1 Name" are embedded. In some embodiments, in addition to embedding the candidate document tags, the user may directly edit the contents of the document template 310.

Example Form Interface

FIG. 4 illustrates a form interface 400 of the document management system 110, in accordance with an example embodiment. The document management system 110 generates the form interface 400 after the user embeds the candidate document tags via the embedded tagging interface 300. The form interface 400 may be specific to the type of the document template 310 and includes one or more interface elements 420 that each correspond to a candidate document tag selected by the user. Each interface element includes a field to be completed with a data value, which may be done by manual input from a user and/or by accessing a database. For example, in FIG. 4, the interface element 420 corresponds to the candidate document tag 330, "Party 2 Name," and is completed with the data value "XYZ Property Managers."

In some embodiments, the form interface 400 also includes a list of suggested terms 440 that correspond to candidate document tags that have not been embedded into the document template 310. If the user selects one of the suggested terms 440, the form interface 400 is modified to include a new interface element 420 corresponding to the selected suggested term. The document template 310 updates, by including appropriate text and a new candidate document tag, to account for the user's selection of the suggested term.

FIG. 5 illustrates an interface 500 of the document management system 110 for viewing a generated document 510, in accordance with an example embodiment. The generated document 510 modifies the document template 310 to incorporate data from the completed form interface 400. The generated document 510 displays the data values corresponding to each embedded candidate document tag in place of the text representation for the embedded candidate document tag. For example, in FIG. 5, the data value 420 corresponds to the candidate document tag 330, "Party 2 Name." In the generated document 510, the data value 420, "XYZ Property Managers," replaces the text "Party 2 Name." Any updates to the document template 310 resulting from the user's selection of one or more of the suggested terms 440 will be reflected in the generated document 510. The generated document 510 also preserves the formatting rules of the document template 310. The data value 420 remains the same font size and style as its surrounding text, which dynamically shifts to make room for the data value 420. Similarly, the data values for "Effective Date" and "Termination Date" maintain the indentation 350 found in the document template 310.

The user may take one or more document actions 520 with respect to the generated document 510. Example document actions include, but are not limited to, editing, finalizing, signing, approving, and rejecting the generated document 510. In some embodiments, upon the user's instruction, the document management system 110 provides the generated document 510 to a second user to perform another document action.

Figure 6:
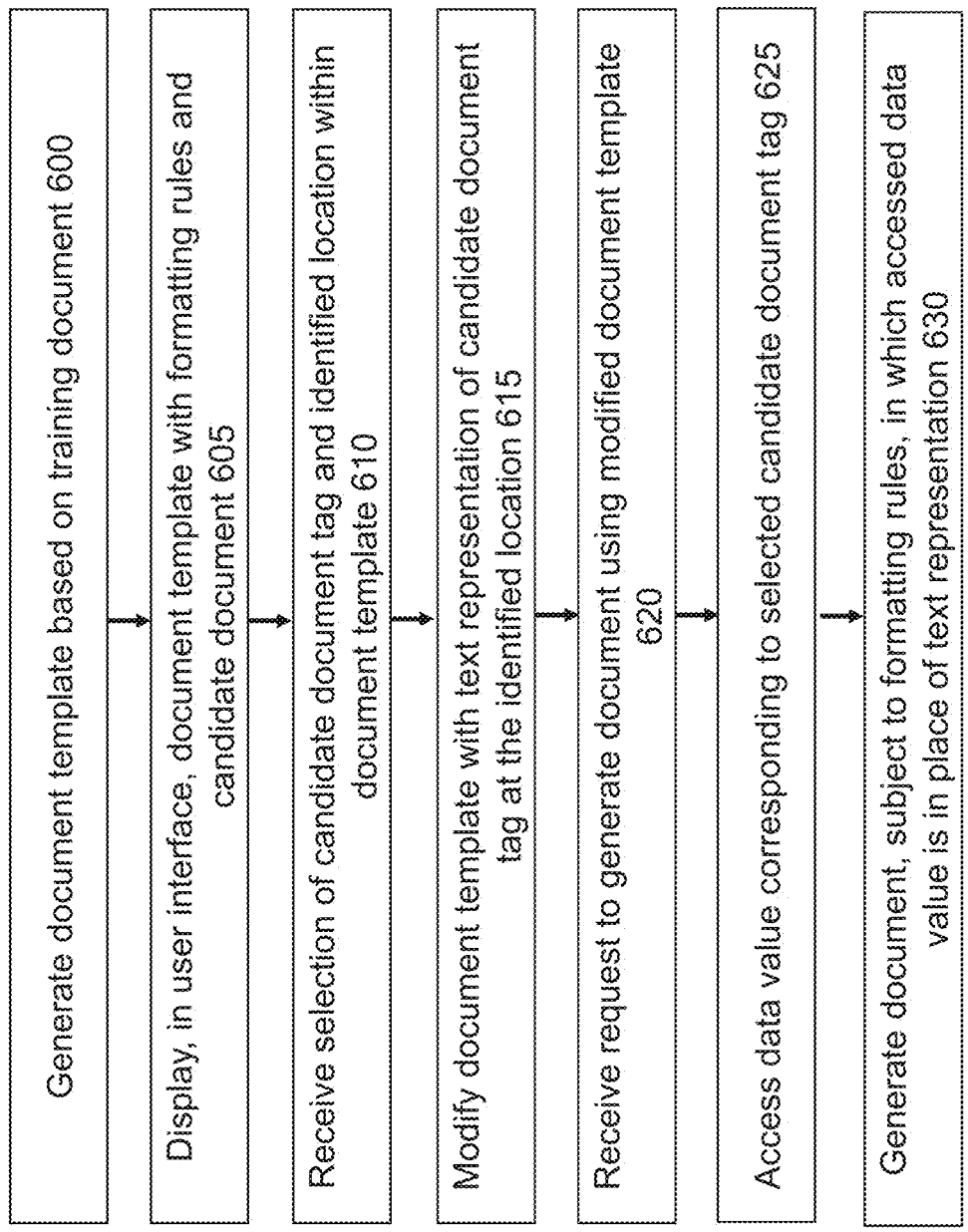
FIG. 6 illustrates an example process for embedded tagging in the document management system, in accordance with an example embodiment.

FIG. 6 illustrates an example process for embedded tagging in a document management system, in accordance with an example embodiment. The document management system (e.g., the document management system 110) generates 600 a document template (e.g., the document template 310) based on a training document received from a user (e.g., one of the users 130A-B). The document management system displays 605 the document template in a first interface portion and a set of candidate document tags (e.g., the set of candidate document tags 320) in a second interface portion. The document template is displayed as per one or more document formatting rules. The document management system receives 610 a selection of a candidate document tag (e.g., the candidate document tag 330) and an identification of a location within the displayed document template (e.g., the identified location 340). The document management system modifies 615 the document template with a text representation of the selected candidate document tag within text of the displayed document template at the identified location. The document management system receives 620 a request (e.g., from the user) to generate a document using the modified document template. In response, the document management system accesses 625 a data value corresponding to the selected candidate document tag and generates 630 the document using the modified document template. The generated document (e.g., the generated document 510) includes the accessed data value in place of the text representation of the selected candidate document tag and is subject to the one or more document formatting rules.

Figure 7:
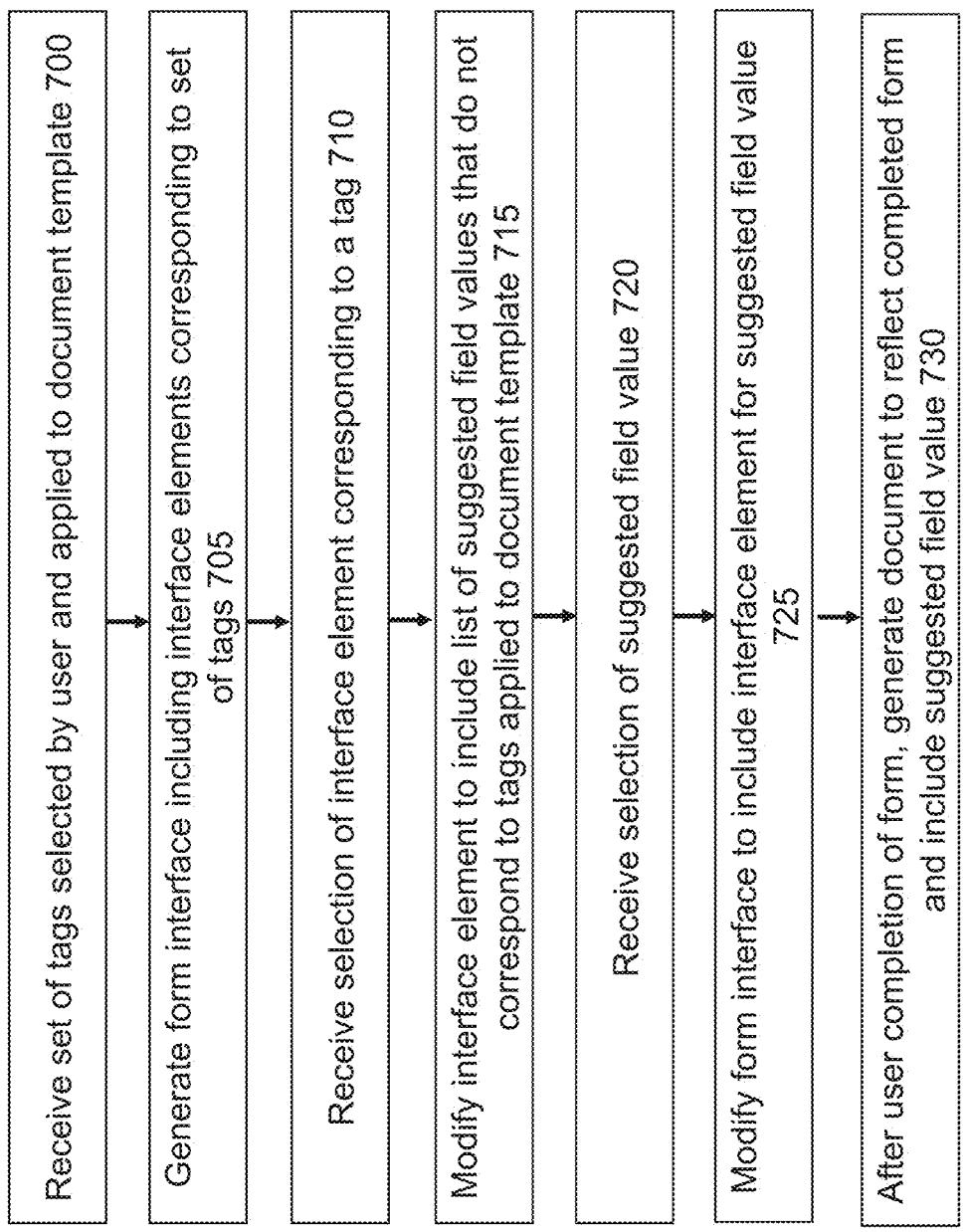
FIG. 7 illustrates an example process for automatically generating a form interface in the document management system, in accordance with an example embodiment.

FIG. 7 illustrates an example process for automatically generating a form interface in the document management system, in accordance with an example embodiment. The document management system receives 700 a set of tags (e.g., including the candidate document tag 330) selected by the user and applied to the document template. The document management system generates 705 a form interface (e.g., the form interface 400), which includes one or more interface elements (e.g., the interface element 420) corresponding to each of the set of tags. The document management system receives 710 a selection of an interface element corresponding to a tag. The selected interface element includes a field. The document management system modifies 715 the interface element corresponding to the tag to include a populated list of suggested field values (e.g., the suggested terms 440), where at least one of the suggested field values corresponds to a set of secondary tags that have not been applied to the document template. The document management system receives 720 a selection of a suggested field value corresponding to the set of secondary tags. The document management system modifies 725 the form interface such that the interface element includes fields corresponding to each of the set of secondary tags. In response to the user completing the form interface, the document management system generates 730 a document using the document template. The generated document includes selected field values in place of each of the set of tags applied to the document template and additionally includes field values corresponding to each of the set of secondary tags.

Example Document Workflow Interface

FIG. 8 illustrates a workflow interface 800 in the document management system 110, in accordance with an example embodiment. As described with respect to FIG. 5, the user may manually take one or more document actions 520 after viewing a generated document 510. In some embodiments, the document management system 110 enables the user to set up an automated workflow for document actions in the workflow interface 800. First, the user selects a starting workflow interface element 810, in response to which the workflow interface 800 presents a set of first workflow operations 820. After the user selects a first workflow operation 825, the workflow interface 800 displays fields for parameters 830 specific to the first workflow operation 825. In some embodiments, the first workflow operation 825 may result in a variety of outcomes. The workflow interface 800 further includes workflow branches which connect each outcome to a different set of document actions. Examples of workflow branches include, but are not limited to, approval workflows 840, rejection workflows 850, signature workflows, routing workflows, and any combination thereof.

An approval workflow 840 designates one or more document actions for the document management system 110 to perform if an approver (e.g., a second user) approves the target document. For example, the approval workflow 840 may require the document management system 110 to seek signatures from the approver, or provide the target document to a second approver, for example. The rejection workflow 850 designates one or more document actions for the document management system 110 to perform if the approver rejects the target document. For example, the rejection workflow 850 may require the document management system 110 to send the target document back to the user or to another approver. A signature workflow requires that the target document be executed by one or more users of the document management system 110. In some embodiments, the signature workflow follows the approval workflow 840. A routing workflow requires that the target document be sent to multiple users. For example, combining the approval workflow 840, routing workflow, and signature workflow may require the document management system 110 to send the target document to a second user for signing, once the first approver has approved the target document. If a threshold amount of time passes without an approver or signer taking any action on the target document (e.g., if an approver fails to approve, reject, or sign the target document), the document management system 110 may perform a time-based workflow operation. The time-based workflow operation may require, for example, the document management system 110 to send the target document back to the user or send a reminder to the approver or signer. The document management system 110 initiates the workflow for a target document when prompted by the user. The document management system 110 performs at least a portion of the workflow as per an order of the workflow operations on the workflow interface 800.

For example, in FIG. 8, the selected first workflow operation 820 is legal approval; the associated parameters 830 include an approver's name and email address, as well as an email message to send to the approver. When requested by the user, the document management system 110 initiates the legal approval workflow, which is the first workflow operation 825. The document management system 110 sends the target document to the approver by email and includes the email message, as per the parameters 830. Then, if the approver approves the target document, the document management system 110 performs the approval workflow 840. If the approver rejects the target document, the document management system 110 performs the rejection workflow 850. The user may define a time-based workflow operation for the document management system 110 to follow if the approver fails to approve or reject the target document.

A workflow branch may created automatically, or may be suggested to a user based on a type of workflow operation selected by the user. For instance, if the user selects a security workflow operation, a credentials check workflow branch can be created that is configured to enable an entity to authenticate themselves, and the credentials check workflow branch can include an authenticated workflow branch in the event the entity authenticates themselves (for instance, that leads to a document signature workflow branch), and a recursive rejected workflow branch in the even that the entity is unable to authenticate themselves (for instance, that leads back to the credentials check workflow branch, enable the entity to try to authenticate themselves again). Likewise, if the user selects a notary workflow operation, a notarization workflow branch can be created that is configured to enable a third party notary to witness an electronic signature process. The notarization workflow branch can include a "notary present" workflow branch that enables the electronic signature process to proceed if a notary is able to witness the electronic signature process (e.g., either in person or remotely), and can include a "notary not present" workflow branch that prevents that workflow from proceeding to the electronic signature process until a notary is present.

In some embodiments, a workflow branch may be created automatically, or may be suggested to a user based on parameter or parameter value selected by the user when defining a workflow operation. For example, if the user selects a transaction amount parameter in a signature request, a payments workflow branch can be created that enables a signing entity to provide account information for a transfer of funds associated with the signature document. Likewise, if the user selects a transaction parameter value that is greater than a particular threshold (e.g., the user requests $1,000,000 from the signing entity when the threshold value is $500,000), a supervisor workflow branch is created to enable a supervisor of the signing entity to sign off on the requested cost before the signing entity transfers funds.

In some embodiments, a workflow branch associated with a first workflow operation can return to a previous workflow operation. For example, for a workflow that 1) authenticates a user, 2) requests that the user review a document, and 3) requests that the user sign a document, sequentially for each of a plurality of users, a workflow branch can extend from the signing workflow operation to the authentication workflow operation. This enables a first user to be authenticated, review and sign the document, then enables a next user to be authenticated, review and sign the document, and so forth until each of the plurality of users has signed the document.

Figure 9:
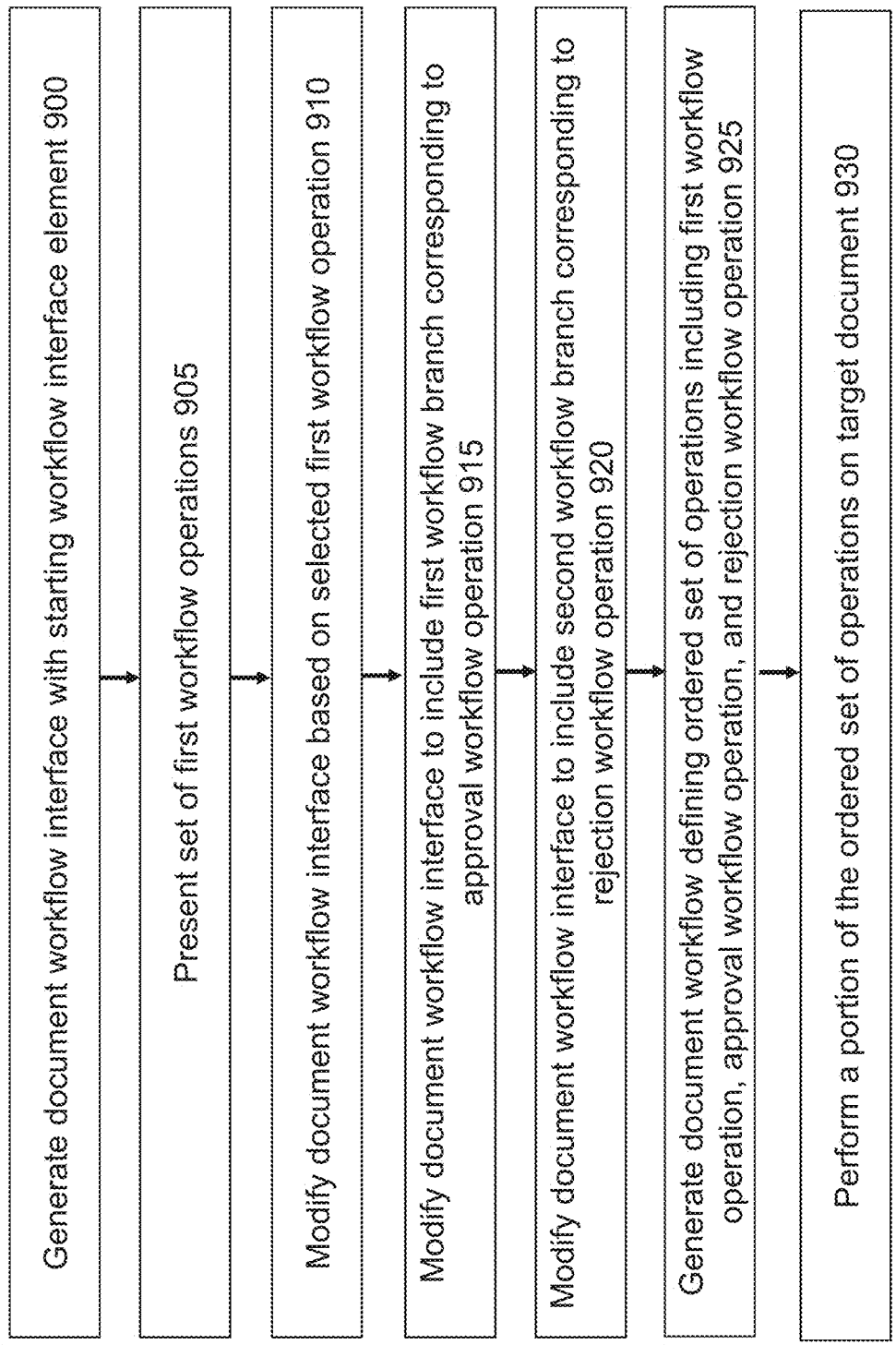
FIG. 9 illustrates an example process for customizing a document workflow in the document management system, in accordance with an example embodiment.

FIG. 9 illustrates an example process for customizing a document workflow in the document management system, in accordance with an example embodiment. The document management system generates 900 a document workflow interface (e.g., the workflow interface 800). The document workflow interface comprises a starting workflow interface element (e.g., the starting workflow interface element 810). The document management system presents 905 a set of first workflow operations (e.g., the set of first workflow operations 820) in response to a selection of the starting workflow interface element. For example, the user may click on or otherwise interact with the starting workflow interface element. The document management system modifies 910 the document workflow interface by modifying the starting workflow interface element based on a selected first workflow operation (e.g., the first workflow operation 825). The modified starting workflow interface element includes fields defining parameters (e.g., the parameters 830) of the selected first workflow operation. The document management system modifies 915 the document workflow interface to include a first workflow branch corresponding to an approval workflow operation (e.g., the approval workflow 840). The document management system modifies 920 the document workflow interface to include a second workflow branch corresponding to a rejection workflow operation (e.g., the rejection workflow 850). After the approval and rejection workflow operations are defined, the document management system generates 925 a document workflow defining an ordered set of operations. The ordered set of operations includes the first workflow operation, the approval workflow operation, and the rejection workflow operation. The document management system performs 930 at least a portion of the ordered set of operations on a target document after receiving a request to initiate the document workflow on the target document.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising:
generating, using at least one processor, a document template based on a training document;
displaying, using the at least one processor, the document template in a first interface portion and a set of candidate document tags in a second interface portion, the document template displayed according to one or more document formatting rules, the set of candidate tags is determined based on a type of the training document using a machine learning model, the displaying including displaying a list of suggested terms, corresponding to one or more candidate document tags in the set of candidate tags, that have not been embedded into the document template;
receiving, using the at least one processor, a selection of at least one of: a candidate document tag and at least one suggested term in the list of suggested terms, and any combination thereof, and an identification of a location within the displayed document template;
modifying, using the at least one processor, the document template by including a text representation of the selection within a text of the displayed document template at the identified location; and
in response to receiving a request to generate a document using the modified document template:
accessing, using the at least one processor, a data value corresponding to the text representation of the selection; and
generating, using the at least one processor, a document using the modified document template such that the accessed data value is included in place of the text representation of the selection and subject to the one or more document formatting rules.

2. The method of claim 1, wherein at least one candidate document tag corresponds to a text-based object that changes in size based on a length of the accessed data value.

3. The method of claim 1, wherein generating the document template based on the training document received from a user comprises using the machine learned model configured to identify a type of the training document and generate terms corresponding to the type of the training document.

4. The method of claim 3, further comprising selecting, using the at least one processor, the set of candidate document tags for display in the second interface portion based on the type of the training document.

5. The method of claim 1, wherein the one or more document formatting rules include at least one of the following: a bullet point formatting rule, an indentation rule, a font type rule, a font size rule, a text style rule, and any combinations thereof.

6. The method of claim 1, further comprising receiving, using the at least one processor, input from a user specifying the data value corresponding to the selection.

7. The method of claim 1, further comprising receiving, using the at least one processor, the data value corresponding to the selection from a database.

8. A non-transitory computer-readable storage medium storing executable instructions that, when executed by at least one processing circuitry, cause the at least one processing circuitry to:
   generate a document template based on a training document;
   display the document template in a first interface portion and a set of candidate document tags in a second interface portion, the document template displayed according to one or more document formatting rules, the set of candidate tags is determined based on a type of the training document using a machine learning model, the displaying including displaying a list of suggested terms, corresponding to one or more candidate document tags in the set of candidate tags, that have not been embedded into the document template;
   receive a selection of at least one of: a candidate document tag and at least one suggested term in the list of suggested terms, and any combination thereof, and an identification of a location within the displayed document template;
   modify the document template by including a text representation of the selection within a text of the displayed document template at the identified location; and
   in response to receiving a request to generate a document using the modified document template:
      access a data value corresponding to the text representation of the selection; and
      generate a document using the modified document template such that the accessed data value is included in place of the text representation of the selection and subject to the one or more document formatting rules.

9. The non-transitory computer-readable storage medium of claim 8, wherein at least one candidate document tag corresponds to a text-based object that changes in size based on a length of the accessed data value.

10. The non-transitory computer-readable storage medium of claim 8, wherein generating the document template based on the training document received from a user comprises using the machine learned model configured to identify a type of the training document and generate terms corresponding to the type of the training document.

11. The non-transitory computer-readable storage medium of claim 10, wherein the instructions cause the at least one processing circuitry is further configured to select the set of candidate document tags for display in the second interface portion based on the type of the training document.

12. The non-transitory computer-readable storage medium of claim 8, wherein the one or more document formatting rules include at least one of the following: a bullet point formatting rule, an indentation rule, a font type rule, a font size rule, a text style rule, and any combinations thereof.

13. The non-transitory computer-readable storage medium of claim 8, wherein the instructions cause the at least one processing circuitry is further configured to receive input from a user specifying the data value corresponding to the selection.

14. The non-transitory computer-readable storage medium of claim 8, wherein the instructions cause the at least one processing circuitry is further configured to receive the data value corresponding to the selection from a database.

15. A document management system, comprising:
   at least one processing circuitry; and
   a non-transitory computer-readable storage medium storing executable instructions that, when executed, cause the at least one processing circuitry to:
      generate a document template based on a training document;
      display the document template in a first interface portion and a set of candidate document tags in a second interface portion, the document template displayed according to one or more document formatting rules, the set of candidate tags is determined based on a type of training document using a machine learning model, the displaying including displaying a list of suggested terms, corresponding to one or more candidate document tags in the set of candidate tags, that have not been embedded into the document template;
      receive a selection of at least one of: a candidate document tag and at least one suggested term in the list of suggested terms, and any combination thereof, and an identification of a location within the displayed document template;
      modify the document template by including a text representation of the selection within a text of the displayed document template at the identified location; and
      in response to receiving a request to generate a document using the modified document template:
         access a data value corresponding to the text representation of the selection; and
         generate a document using the modified document template such that the accessed data value is included in place of the text representation of the selection and subject to the one or more document formatting rules.

16. The document management system of claim 15, wherein at least one candidate document tag corresponds to a text-based object that changes in size based on a length of the accessed data value.

17. The document management system of claim 15, wherein generating the document template based on the training document received from a user comprises using the machine learned model configured to identify a type of the training document and generate terms corresponding to the type of the training document.

18. The document management system of claim 17, wherein the at least one processing circuitry is further configured to select the set of candidate document tags for display in the second interface portion based on the type of the training document.

19. The document management system of claim 15, wherein the one or more document formatting rules include at least one of the following: a bullet point formatting rule, an indentation rule, a font type rule, a font size rule, a text style rule, and any combinations thereof.

20. The document management system of claim 15, wherein the at least one processing circuitry is further configured to receive input from a user specifying the data value corresponding to the selection.

\* \* \* \* \*